Dec. 27, 1927. 1,654,129
T. LACONI ET AL
VEHICLE DIRECTION INDICATOR
Filed May 12, 1926 2 Sheets-Sheet 1
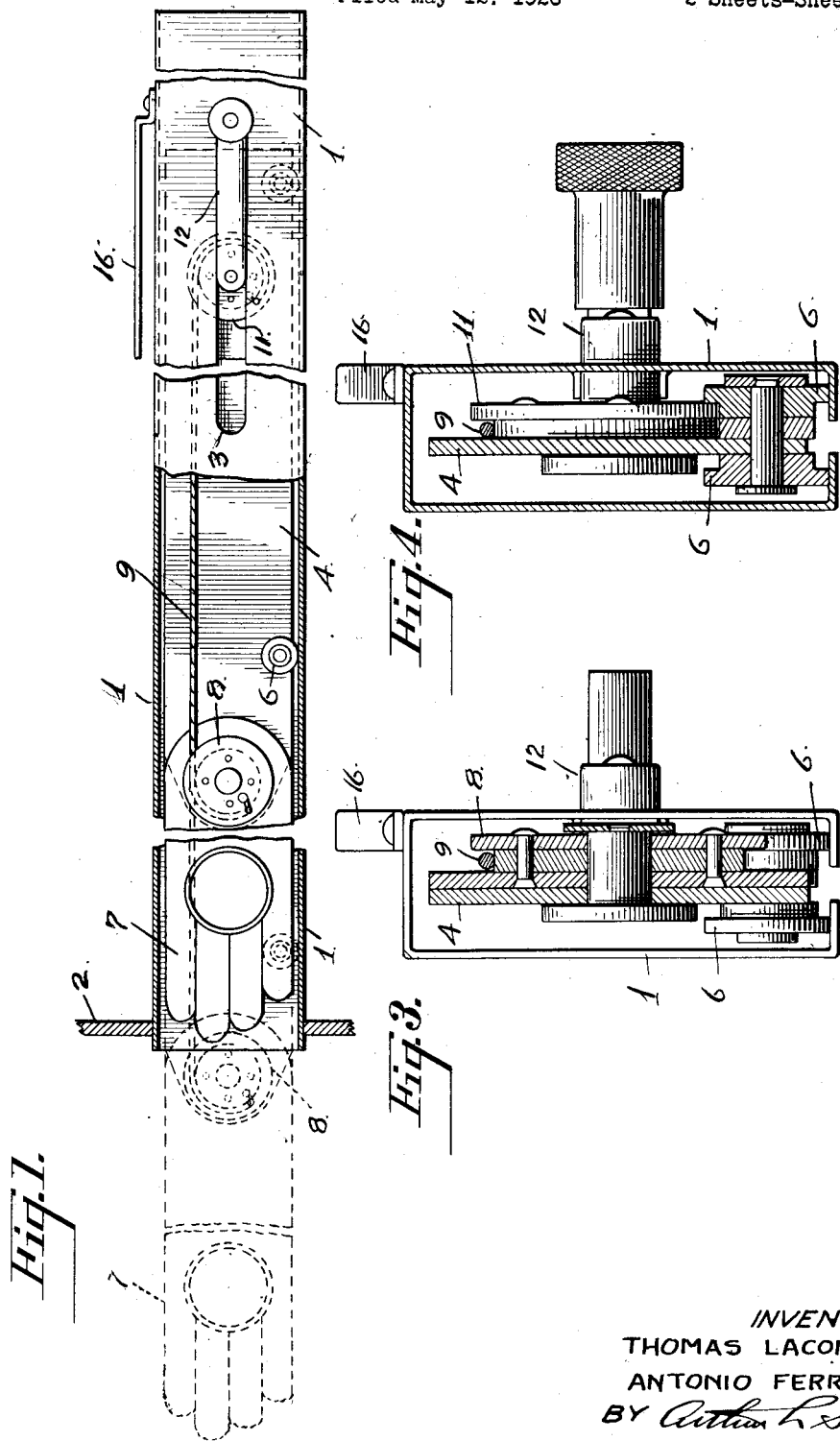
INVENTORS
THOMAS LACONI
ANTONIO FERRETTI
BY Arthur L. Slee.
ATTY

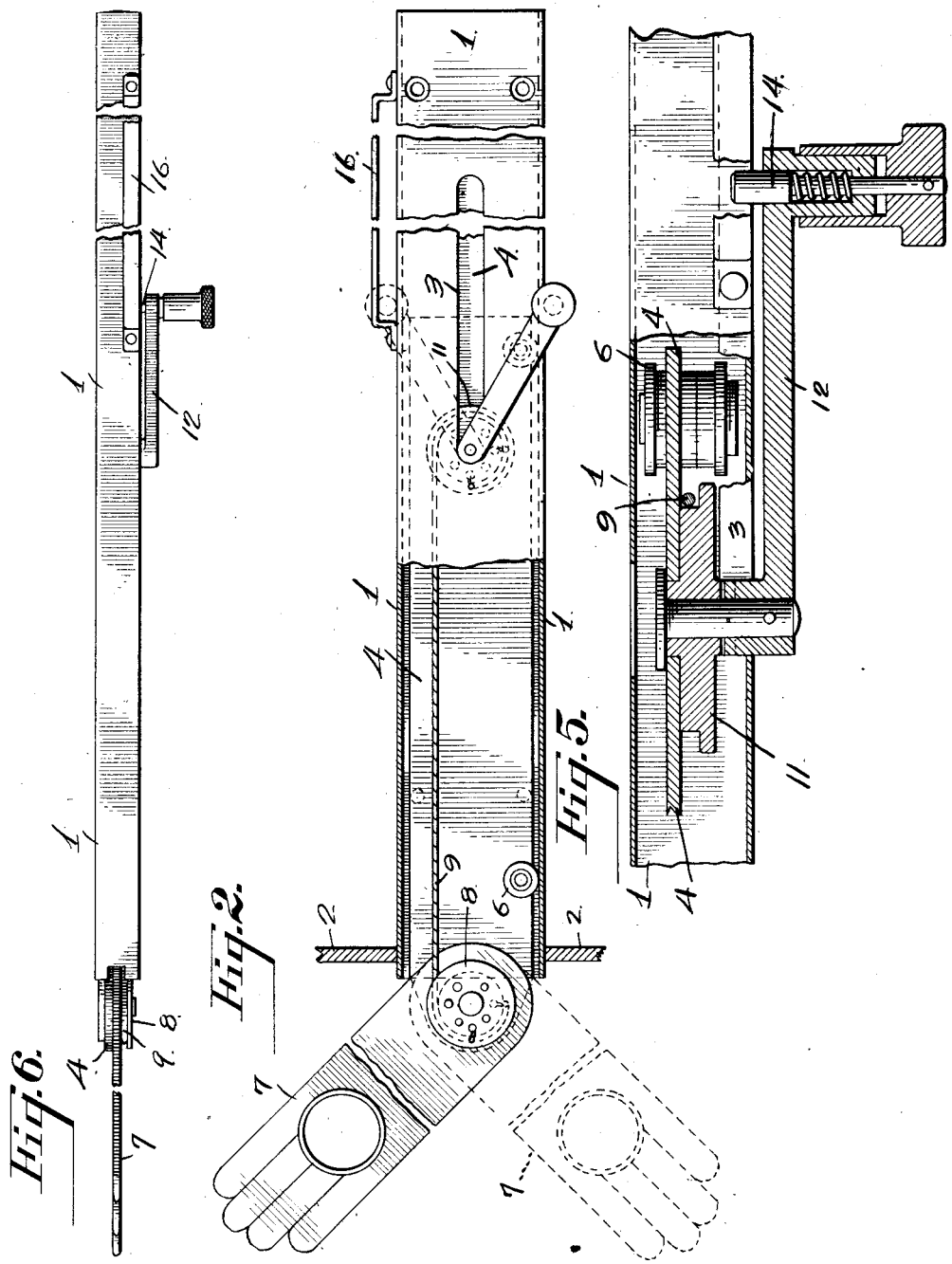

Patented Dec. 27, 1927.

1,654,129

UNITED STATES PATENT OFFICE.

THOMAS LACONI AND ANTONIO FERRETTI, OF SAN FRANCISCO, CALIFORNIA.

VEHICLE DIRECTION INDICATOR.

Application filed May 12, 1926. Serial No. 108,602.

Our invention relates to an improved article of manufacture comprising an improved vehicle direction indicator, wherein a slidably mounted bar operates in conjunction with a pivotally mounted signal on said bar to project said signal beyond the side of a vehicle and also with means for actuating the signal to indicate other directions.

The primary object of the present invention is to provide a new and improved article of manufacture comprising a new and improved vehicle direction indicator.

A further object of the present invention is to provide a new and improved device of the character described which shall be normally concealed, but which may be projected easily and quickly by an operator to indicate the change of direction about to be taken by said vehicle.

Another object is to provide a new article of the type set forth, having few parts which may be easily and cheaply manufactured and easily installed on present vehicles.

A still further object is to provide an improved device of the character described, which may be used for open and closed motor vehicles.

The invention consists of the details of construction disclosing the drawings forming a part of the present specification, wherein like characters of reference are used to designate similar parts throughout the said specification and drawings, and in which—

Fig. 1 is a broken front elevation of our improved device, disclosing the inoperative position in full lines and one direction indicating position in dotted lines.

Fig. 2 is a similar view disclosing a second direction indicating position in full lines, and a third direction indicating position of the signal in dotted lines;

Fig. 3 is an enlarged end elevation, partly in section, disclosing the manner in which the signal is pivotally connected to the slidable bar;

Fig. 4 is an enlarged transverse sectional view disclosing the manner in which the actuating mechanism is connected;

Fig. 5 is an enlarged sectional detailed view of the actuating mechanism; and

Fig. 6 is a plan view of the device.

Referring to the drawings, the numeral 1 is used to designate a tubular member arranged transversely to a motor vehicle adjacent the operator's position and having one open end adjacent the side 2 of the motor vehicle, not shown. The tubular member is provided with a longitudinally disposed slot 3 on the side thereof adjacent the operator's position.

Within the tubular member 1 is slidably mounted for longitudinal movement therein a bar 4, said bar being provided with suitable rollers or wheels 6 to facilitate movement of said bar within said tubular member 1. Upon the end of the bar 4 adjacent the open end of the tubular member 1 is pivotally mounted a direction signal 7, which, to render it more conspicuous for its purpose, may be in the form of a human hand with the fingers extended. The direction signal 7 has rigidly secured thereon a pulley 8, to which is secured a suitable cord 9 extending around a second pulley 11, rotatably mounted adjacent the opposite end of the bar 4, and movable longitudinally with said bar 4. The pulley 11 has rigidly secured thereto a suitable handle 12, extending through the slot 2 of the tubular member 1, the free end of said handle 12 being provided with a suitable spring controlled pawl or latch 14, which normally but detachably engages the slot 3 of said tubular member 1. Adjacent the slot 3 and on the upper side of the tubular member 1 is a bracket 16, the purpose of which will hereinafter be more fully set forth.

In operation the bar is withdrawn, with its direction signal 7, into the tubular member 1, as disclosed in full lines in Fig. 1 of the drawings. In this position it should be noted that the direction signal 7 is alined with the bar 4 and is concealed within said tubular member 1. When it is desired to indicate to following vehicles that the present vehicle is about to turn to the left, the operator grasps the free end of the handle, and without disengaging the pawl or latch 14 from the slot 3, moves the bar 4 and signal 7 thereon outwardly until said signal 7 is projected beyond the open end of the tubular member 1 and the side of the vehicle, thereby indicating to following vehicles that the present vehicle is about to turn to the left. During this movement of the bar 4 and signal 7, the latch or pawl 14 remains in engaging relation with the slot 3 and readily slides therein, and by means of the cord 9 and pulleys 8 and 11, retains the signal 7 in a horizontal position to indicate a turn to the left.

If the driver intends to turn to the right, the pawl or latch 14 is disengaged from the slot 3 of the tubular member 1, and the handle 12 is depressed which, through the medium of the pulleys 8 and 11 and the cord 9, will move the signal 7 upward to the position indicated in full lines in Fig. 2 of the drawings, which will indicate a direction to the right.

When the driver of the present vehicle intends to stop, he may indicate or signal such direction or intention by raising the handle 12, instead of depressing the same, until the pawl 14 is positioned directly opposite the space between the bracket 16 on top of the tubular member 1, thereby, through the medium of the pulleys 8 and 11 and the cord 9, allowing the signal 7 to drop by gravity, to the position indicated in dotted lines in Fig. 2 of the drawings, thereby indicating a direction to the effect that said present vehicle is about to stop. By releasing the pawl or latch 14 while in this position, said pawl or latch 14, will engage the space between the bracket 16 and the top of the tubular member 1 and the free end of the handle 12 will thereby be held against further movement by said bracket 16 and, consequently, the signal 7 will be held in the proper position.

No bracket is needed for the position of the handle 12 and signal 7 indicating a direction to the right, for the reason that when indicating this position the handle will be depressed and the pawl may be released to engage the under side of the tubular member 1, and thereby prevent a return movement of the free end of said handle 12 and a consequent downward movement of the signal 7.

We are aware that the present state of the art discloses vehicle direction indicators wherein a signal is projected beyond the side of a motor vehicle, to indicate the direction about to be taken by said motor. Therefore, we do not wish to claim such a combination broadly, but—

Having thus described our invention what we claim as new and desire to secure by Letters Patent is:

1. In an article of manufacture, a motor vehicle direction indicator comprising a tubular member having a longitudinally disposed slot therein, and adapted for engagement with the cowl of a motor vehicle and having one open end terminating at the side of said vehicle adjacent the operator's position; a bar slidably mounted for longitudinal movement within said tubular member; a direction signal pivotally mounted upon the end of the bar adjacent the open end of the tubular member and the side of said vehicle and arranged to be projected beyond said side of said motor vehicle by said bar to normally signal one direction; a handle pivotally mounted upon the bar for moving said bar and a latch mounted upon the free end of the handle and engaging the slot in the tubular member for normally retaining said direction signal in a position to indicate said direction, said latch being movable to disengage the slot to permit the handle to be moved to actuate said signal to indicate other directions.

2. In an article of manufacture, a motor vehicle direction indicator comprising a slotted tubular member arranged transversely of a motor vehicle adjacent the operator's position, and having one open end terminating at the side of said motor vehicle; a bar slidably mounted for longitudinal movement within said tubular member; a direction signal pivotally mounted upon the end of said bar adjacent the open end of said tubular member and arranged to be moved into and out of said tubular member by said bar; a pulley secured to said direction signal; a second pulley rotatably mounted upon the bar adjacent the slot therein; a cord connected to both pulleys to operate the same simultaneously; a handle mounted upon the rotatable pulley of the bar and projecting through the slot in said tubular member; and means mounted upon the free end of said handle for detachably engaging the slot of the tubular member to prevent rotation of the pulleys to normally maintain said signal in alinement with the bar when the same is moved longitudinally within the tubular member to project said signal beyond the side of said vehicle and for disengaging said slot to permit said handle to be actuated to move said signal through the pulleys and cord to indicate other directions.

3. In a motor vehicle direction indicator, a tubular member arranged to be mounted transversely of a motor vehicle adjacent the operator's position and having one open end arranged adjacent the side of said vehicle, and also having a longitudinally disposed slot arranged in the side thereof adjacent said driver's position; a bar slidably mounted for longitudinal movement within said tubular member; a direction signal pivotally mounted upon the bar and the end adjacent the open end of the tubular member; a pulley rigidly mounted upon said signal at its pivotal point with the bar; a second pulley rotatably mounted upon the bar adjacent the longitudinal slot therein; a cord connecting both pulleys; a handle rigidly connected to the pulley and rotatably mounted upon the bar and extending through the longitudinal slot of the tubular member; and latching means mounted upon the free end of the handle and detachably engaging the slot of the tubular member, whereby said bar and signal thereon may be moved longitudinally within said tubular member to project the signal thereon beyond the side of said vehicle, and thereby indicate a direction, and whereby said free end of said handle may be disengaged from the slot and moved to actuate the signal on the bar to indicate other directions, and to engage the top or bottom of the tubular member to hold said signal in another signalling position.

In witness whereof, we hereunto set our signatures.

THOMAS LACONI.
ANTONIO FERRETTI.